United States Patent
Boecker et al.

(10) Patent No.: US 10,906,735 B2
(45) Date of Patent: Feb. 2, 2021

(54) CONTAINER WITH FILL STATE TRANSMITTER

(71) Applicant: TI Automotive Technology Center GmbH, Rastatt (DE)

(72) Inventors: Albert J. Boecker, Ettlingen (DE); Patrick Gmünd, Karlsruhe (DE); Gerrit Michaelis, Durmersheim (DE); Thorsten Schaefer, Landau Landau (DE)

(73) Assignee: TI AUTOMOTIVE TECHNOLOGY CENTER GMBH, Rastatt (DE)

( * ) Notice: Subject to any disclaimer, the term of this patent is extended or adjusted under 35 U.S.C. 154(b) by 324 days.

(21) Appl. No.: 15/780,820

(22) PCT Filed: Oct. 26, 2016

(86) PCT No.: PCT/EP2016/075747
§ 371 (c)(1),
(2) Date: Jun. 1, 2018

(87) PCT Pub. No.: WO2017/092935
PCT Pub. Date: Jun. 8, 2017

(65) Prior Publication Data
US 2020/0255217 A1    Aug. 13, 2020

(30) Foreign Application Priority Data
Dec. 2, 2015   (DE) .................. 10 2015 224 047

(51) Int. Cl.
*B65D 90/48* (2006.01)
*G01F 23/38* (2006.01)

(52) U.S. Cl.
CPC ............. *B65D 90/48* (2013.01); *G01F 23/38* (2013.01); *B65D 2501/24872* (2013.01)

(58) Field of Classification Search
CPC ......... B65D 90/48; B65D 2501/24872; B65D 43/0202; B65D 51/245; G01F 23/38; G01F 23/36; G01F 23/268; G06K 9/00832; G06K 9/66
USPC ..................................... 324/200, 207.11, 213
See application file for complete search history.

(56) References Cited

U.S. PATENT DOCUMENTS

| 7,315,165 B2 | 1/2008 | Kleinen et al. |
| 2004/0146323 A1 | 7/2004 | Fujisawa et al. |

(Continued)

FOREIGN PATENT DOCUMENTS

| DE | 697 20 116 T2 | 2/2004 |
| DE | 103 60 406 B3 | 3/2005 |

(Continued)

OTHER PUBLICATIONS

Notification of Transmittal of Copies of Translation of the International Preliminary Report on Patentability for International Search Report for International Application No. PCT/EP2016/075747, Dated Jun. 19, 2018, 8 pgs.

(Continued)

*Primary Examiner* — Vincent Q Nguyen
*Assistant Examiner* — Trung Nguyen
(74) *Attorney, Agent, or Firm* — Dickinson Wright PLLC (57) ABSTRACT

A plastic fuel container with a fill level transmitter has a floating body, which is disposed on a rotatably mounted carrier via a lever arm, and a magnet, which is disposed on the carrier and which rotates together with the carrier when the carrier rotates as a result of the floating body, and a Hall sensor, which is disposed in a fixed position relative to the magnet, for detecting a field strength, which changes when the magnet rotates, as a measurement for the fill level in the container. In addition, the Hall sensor is disposed on a sensor carrier which can be mounted from the outer side of the container.

15 Claims, 6 Drawing Sheets

(56) References Cited

U.S. PATENT DOCUMENTS

| | | | |
|---|---|---|---|
| 2004/0182150 A1 | 9/2004 | Okada et al. | |
| 2004/0226365 A1* | 11/2004 | Kleinen | G01F 23/38 73/313 |
| 2007/0090832 A1 | 4/2007 | Yasuda et al. | |
| 2014/0020464 A1 | 1/2014 | Farmanyan | |
| 2015/0369648 A1* | 12/2015 | Bertalan | G01F 23/36 73/313 |

FOREIGN PATENT DOCUMENTS

| | | |
|---|---|---|
| DE | 10360406 B3 | 3/2005 |
| DE | 10 2007 000570 A1 | 4/2009 |
| DE | 102013219578 A1 | 4/2015 |
| JP | 2001052578 A | 7/2007 |
| JP | 2007183241 A | 7/2007 |
| JP | 20080194917 A | 1/2008 |
| JP | 4797872 B2 | 10/2011 |
| JP | 4923822 B2 | 4/2012 |
| KR | 10-2012-0098586 | 9/2012 |
| WO | WO 88/01046 A1 | 2/1988 |

OTHER PUBLICATIONS

German Search Report dated Nov. 12, 2015.
English Translation of Japanese Office Action dated Mar. 12, 2019.
English Translation of Korean Office Action dated Mar. 29, 2019.
International Search Report for International Application No. PCT/EP2016/075747, dated Feb. 7, 2017, 4 pgs.

* cited by examiner

CONTAINER WITH FILL STATE TRANSMITTER

RELATED APPLICATIONS

This application is a 35 U.S.C. § 371 national phase application of International Application No. PCT/EP2016/075747, filed on Oct. 26, 2016, which claims the priority of German Patent Application DE 10 2015 224 047.9, filed Dec. 2, 2015, the contents of which are incorporated herein by reference in their entirety.

FIELD

The present disclosure relates to a container, in particular plastic fuel container, with a fill level transmitter that has a floating body, which is disposed on a rotatably mounted carrier via a lever arm, and a magnet, which is disposed on the carrier and which rotates together with the carrier when the carrier rotates as a result of the floating body, and a Hall sensor, which is disposed in a fixed position relative to the magnet, for detecting a field strength, which changes when the magnet rotates, as a measurement for the fill level in the container. The present disclosure also relates to a corresponding fill level transmitter.

BACKGROUND

In the case of containers for fluids, in particular fuel containers, it is often necessary to obtain information about the respective fill level. A widely used measure for achieving this is disposing a fill level transmitter in the interior of the container, wherein one design of a fill level transmitter comprises a floating body, which is fastened on one end of a rotatably mounted lever arm. Disposed on the rotational axis of the lever arm or a carrier bearing the lever arm is a magnet, for example a cylindrical disc magnet, which rotates proportionally to an increasing or decreasing fluid level. Disposed opposite from the magnet in a fixed orientation is a Hall sensor, which is exposed to a changing magnetic field when the magnet rotates and converts this into an electrical signal as a measurement for the fill level in the container. Known fill level transmitters of this design are disposed completely in the interior of the container and, as a result, are only accessible with difficulty in the case of a malfunction. In addition, most of the time the Hall sensor also forms a construction unit with the floating body mechanical system and cannot be replaced separately.

The present disclosure provides a container of the type cited at the outset, in which the fill level transmitter can be positioned independent of other components disposed in the container.

SUMMARY

The present disclosure separates the electronic part and the mechanical part of the fill level transmitter from each other and disposes them respectively in the region of the container wall. According to the present disclosure, the Hall sensor is therefore disposed on a sensor carrier that can be mounded from the outer side of the container.

According to a first embodiment of the present disclosure, the wall of the container comprises a mounting opening for a sensor adapter, which comprises a portion projecting into the interior space of the container, on which the carrier for the lever arm of the floating body is mounted and in which an insertion opening for the sensor carrier is provided.

The sensor adapter can comprise a cover portion for closing the mounting opening.

Furthermore, the cover portion can comprise an anti-rotation means interacting with a structure disposed on the wall of the container.

The wall of the container preferably comprises an outwardly projecting base, which comprises a circumferential undercut portion at least in segments, on which the cover portion of the sensor adapter can be locked by means of a complementary locking portion.

A seal body is expediently disposed between the sensor adapter and the base.

The sensor carrier expediently comprises a plug socket for connecting a data and power supply line for the electrical power supply and for data transmission.

According to a preferred embodiment of the present disclosure, the wall of the container comprises a fastening contour for a carrier adapter, which is disposed on the inner side of the container, for the lever arm of the floating body and a sensor adapter, which is disposed on the outer side of the container, for the sensor carrier.

The carrier adapter for the lever arm of the floating body is disposed advantageously with an edge portion in an undercut portion of the wall of the container, which is produced by means of a slider arrangement of a blow mold.

The sensor adapter can be disposed especially advantageously on the container if a complementary portion, which is on the outer side of the container, to the undercut portion forms a locking contour for a mounting portion of the sensor adapter.

As an alternative to a lockable connection of the sensor adapter on the wall, the sensor adapter can also be configured as an insertion part for a blow mold, which is blown over during container molding.

To secure the position of the sensor, the sensor adapter comprises an anti-rotation means interacting with a structure disposed on the wall of the container.

Correspondingly, the carrier adapter can comprise at least one anti-rotation means interacting with the wall of the container so that the position of the magnet is secured in relation to the sensor. This can be accomplished for example in that the carrier adapter comprises a plurality of ribs disposed on the face side, which during the mounting of the carrier adapter on the wall of the container, are pressed into the still flow-soft material of the wall.

In addition, the sensor adapter can comprise a central portion for receiving the sensor carrier, which is connected to the mounting portion via a plurality of elastic connecting parts. The elastic connecting parts are like a spring in the direction of the wall and press the central portion of the sensor adapter against the wall in order to effect a more secure positioning of the Hall sensor with respect to the magnet disposed on the other side of the wall.

According to a first variant of the present disclosure, a fill level transmitter for a container of the type described in the foregoing comprises a floating body, which is disposed on a rotatably mounted carrier via a lever arm, and a magnet, which is disposed on the carrier and which rotates together with the carrier when the carrier rotates as a result of the floating body, and a Hall sensor, which is disposed in a fixed position relative to the magnet, for detecting a field strength, which changes when the magnet rotates, as a measurement for the fill level in the container. The fill level transmitter is characterized by a sensor adapter for mounting on a container opening, wherein the sensor adapter comprises a portion projecting into the interior space of the container, on which the carrier of the lever arm of the floating body is mounted, and wherein the sensor adapter comprises an insertion opening for the Hall sensor that is accessible from the outer side of the container. According to a second variant of the present disclosure, the fill level transmitter is characterized by a carrier adapter for the lever arm of the floating body, which is to be disposed on the inner side of the container on a fastening contour of a wall of the container, and a sensor adapter for receiving the Hall sensor, which is to be disposed on the outer side of the container on the wall of the container.

BRIEF DESCRIPTION OF THE DRAWINGS

The present disclosure will be explained in more detail in the following based on exemplary embodiments that are depicted schematically in the drawing. In the drawings.

DETAILED DESCRIPTION

Now, a preferred embodiment of the present disclosure will be described in conjunction with the accompanying drawings. The sizes, materials, and other specific numerical values in the following description of the embodiment are simply by way of examples for ease of understanding of the present disclosure and should not be construed to limit the present disclosure unless otherwise specified. Note that in the description and the drawings, components having substantially the same functions and configurations are designated by the same reference characters, so that their description is not repeated, while components not directly relevant to the present disclosure are not shown.

Figure 1A:
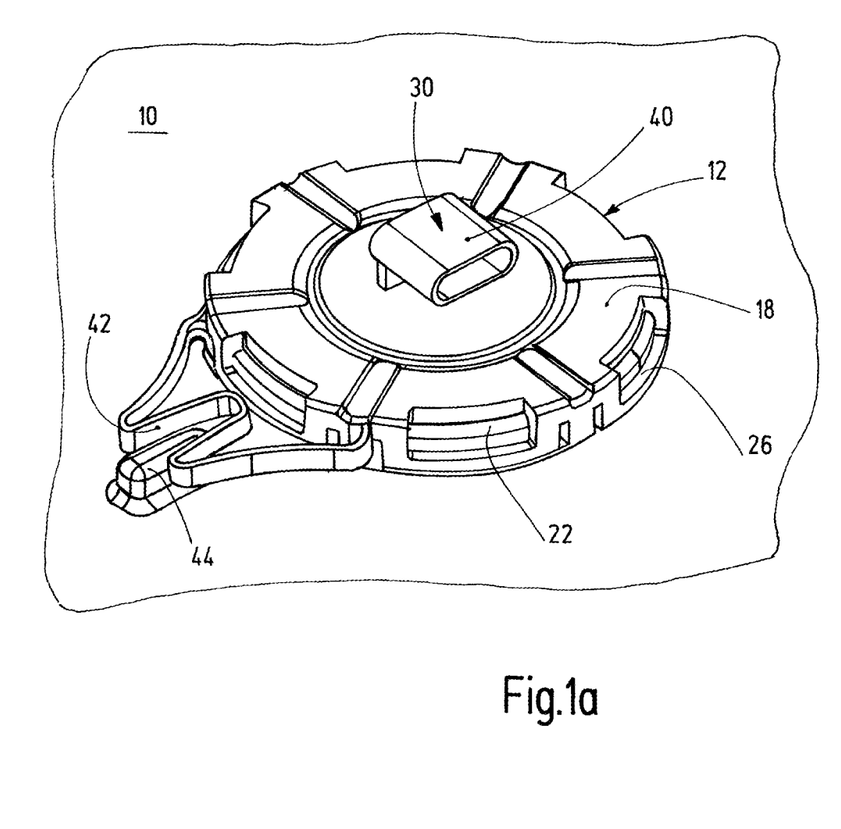
FIGS. 1a and 1b show a perspective view of first variant of a fill level transmitter disposed on a container wall from the outer side and the inner side of the container.
Figure 1B:
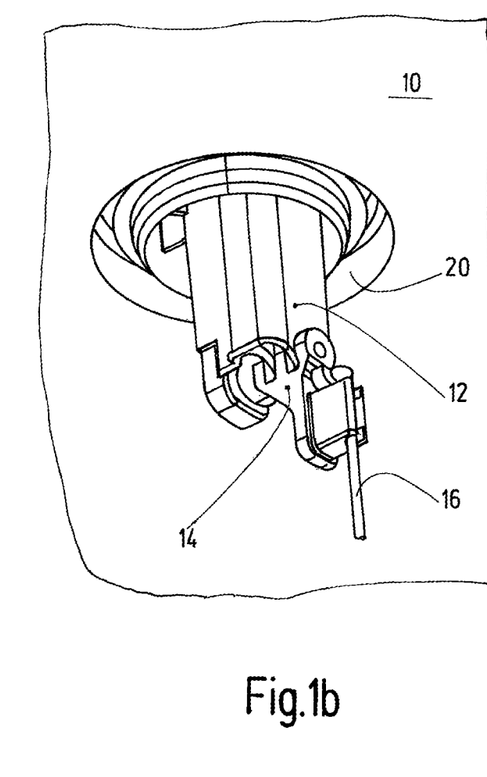
Figure 2:
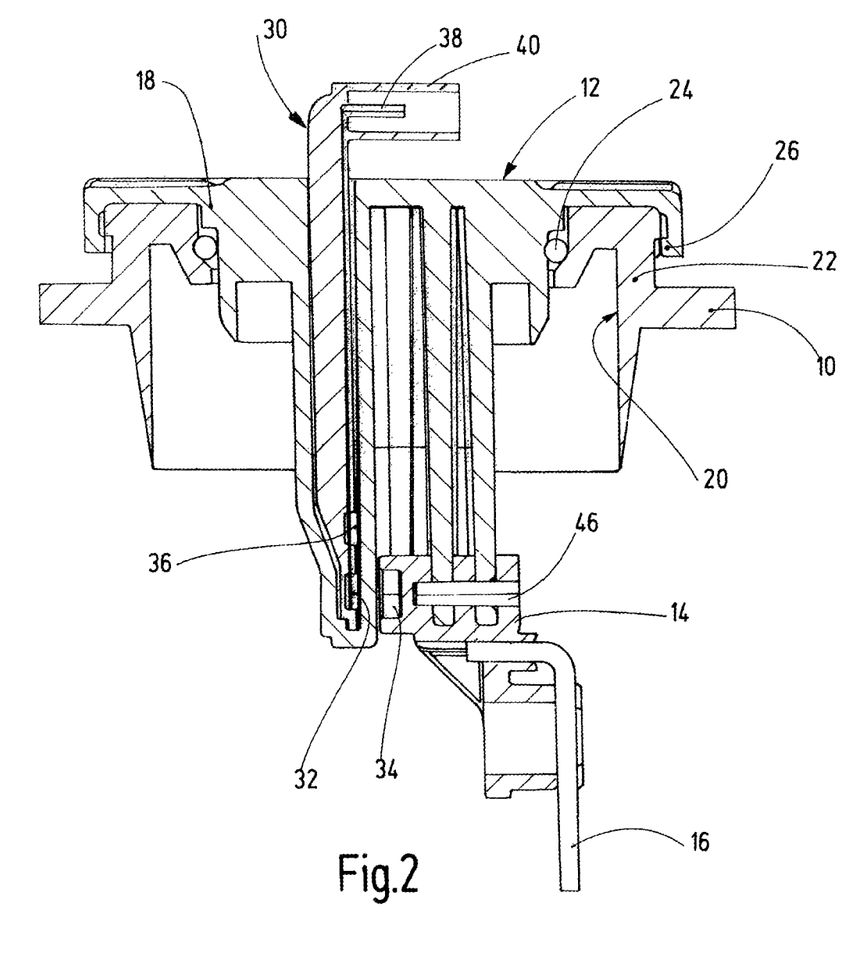
FIG. 2 shows a portion through the fill level transmitter and the container wall according to FIG. 1.
Figure 3:
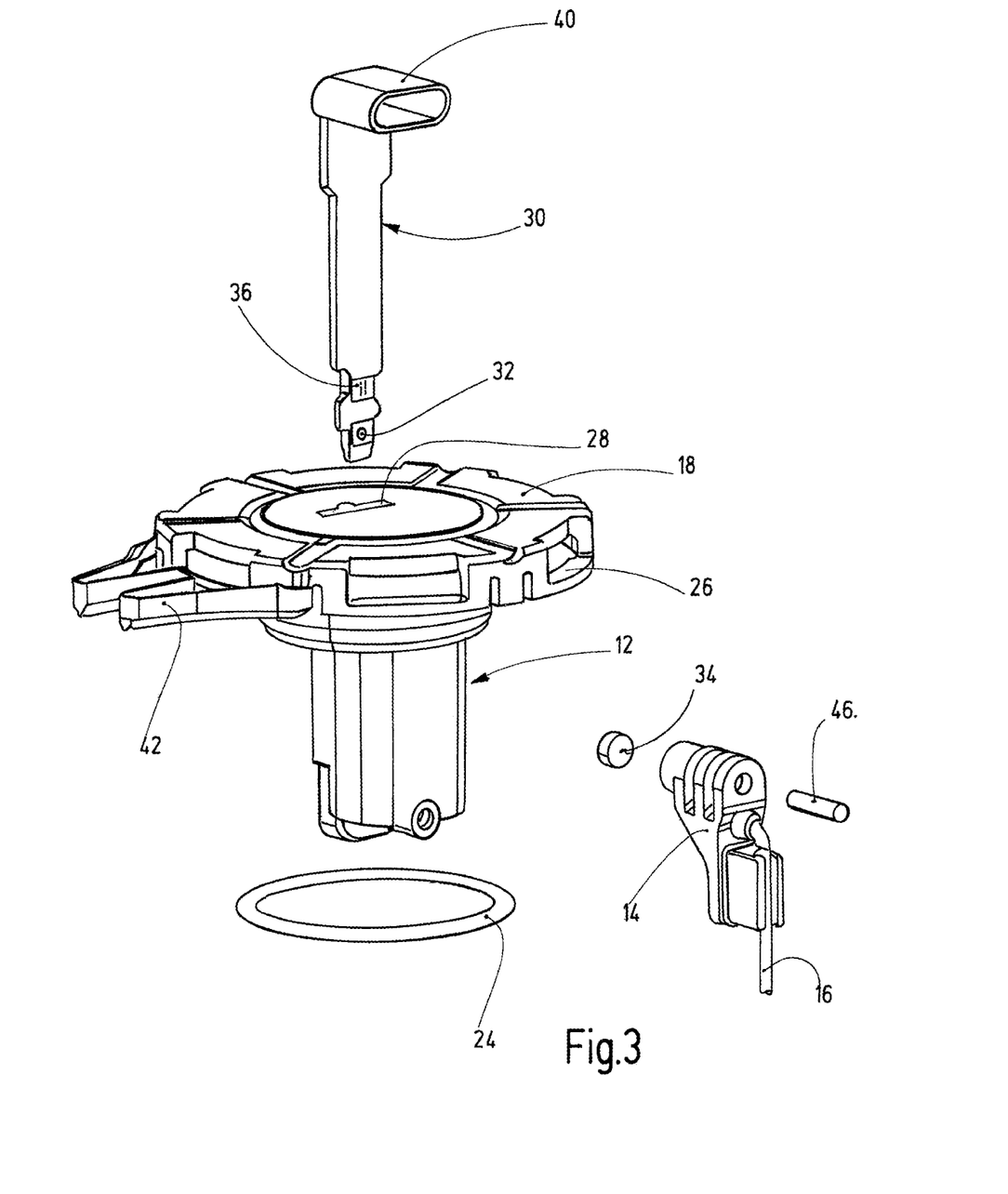
FIG. 3 shows an exploded view of the fill level transmitter according to FIG. 1.
Figure 4A:
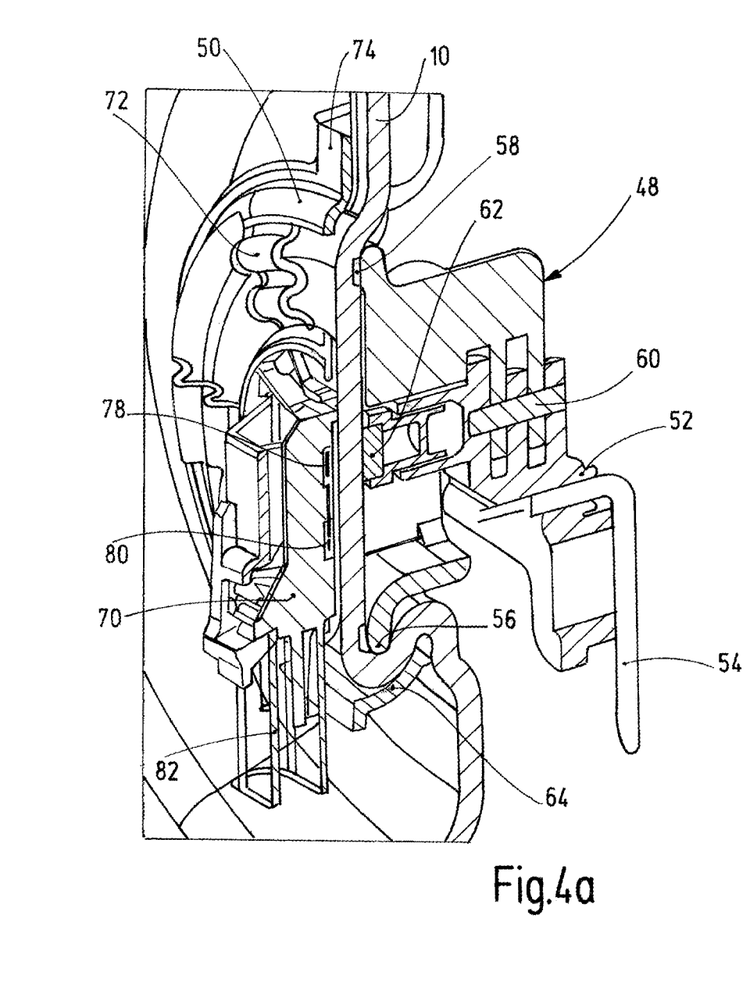
FIGS. 4a and 4b show a perspective sectional view of a second variant of a fill level transmitter disposed on a container wall.
Figure 4B:
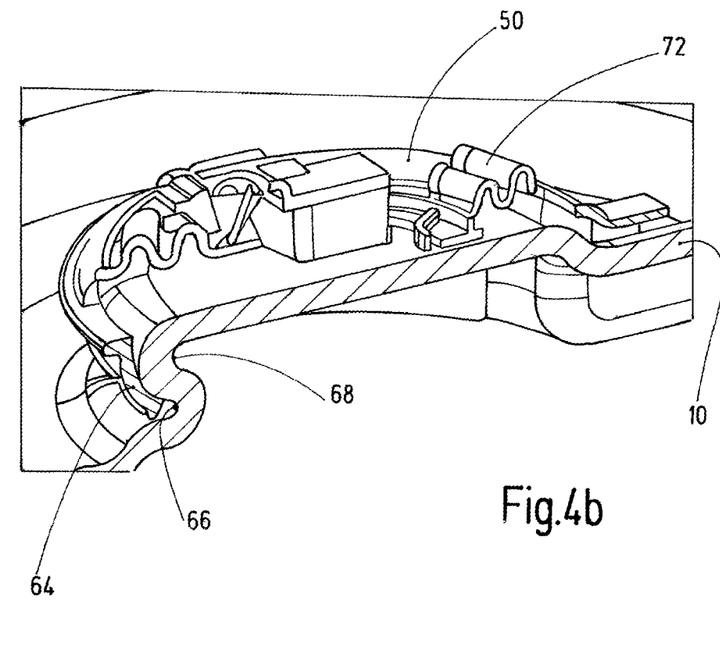
Figure 5A:
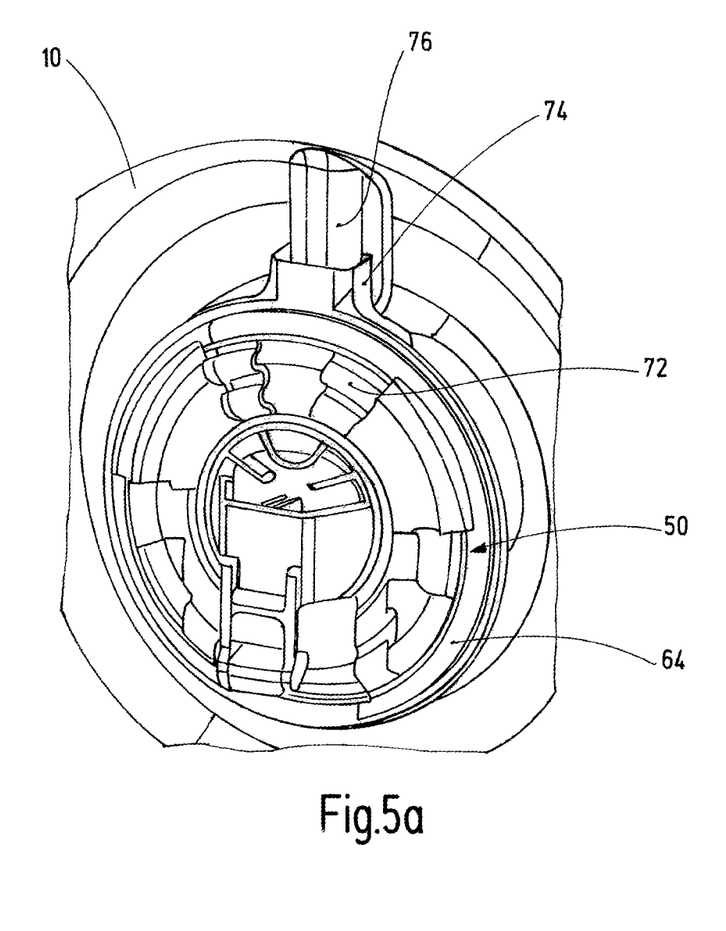
FIGS. 5a and 5b show a sensor adapter and a carrier adapter of the fill level transmitter according to FIG. 4.
Figure 5B:
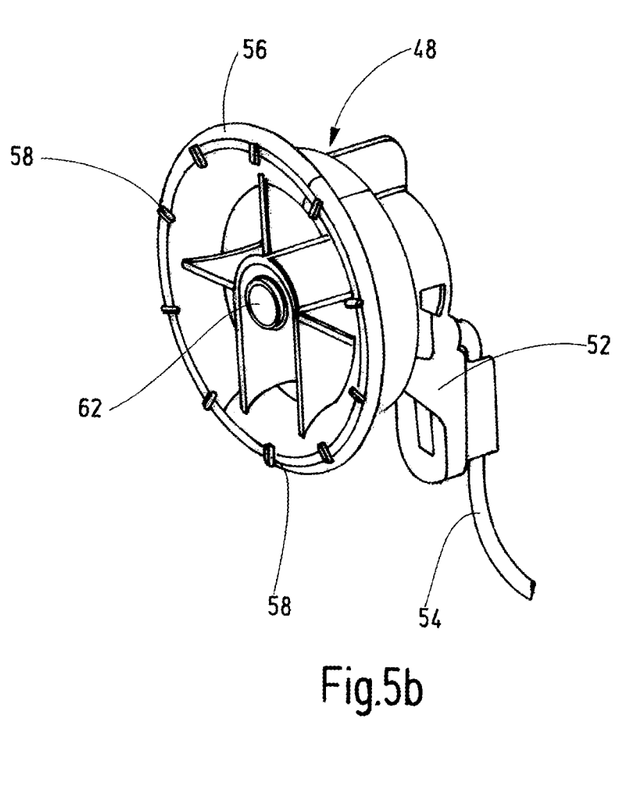
Figure 6:
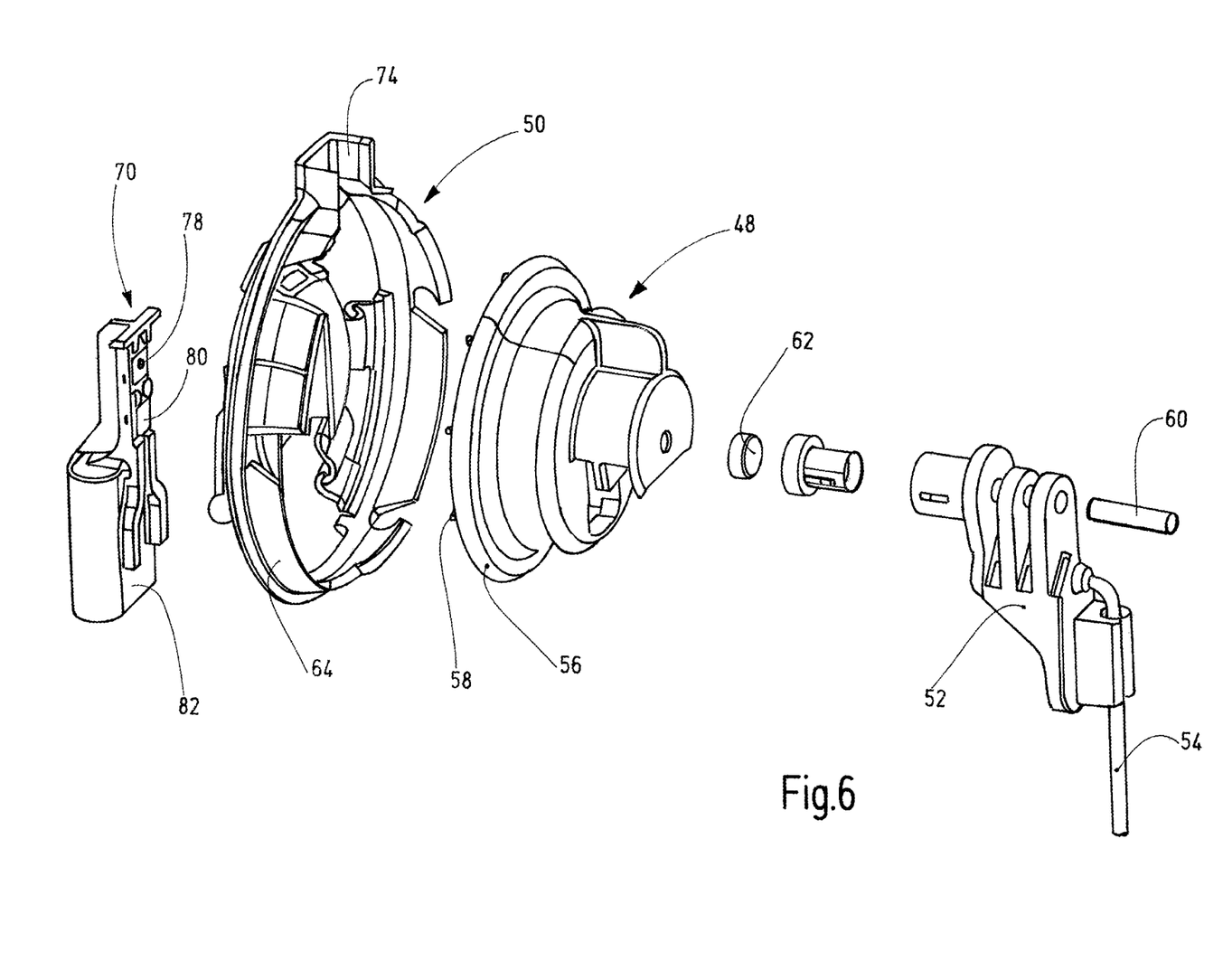
FIG. 6 shows an exploded view of the fill level transmitter according to FIG. 4.

A first variant of a fill level transmitter disposed on a container wall is depicted in FIGS. 1 to 3 and a second variant in FIGS. 4 to 6. The first variant requires an opening in the container wall, while the second variant does not require such an opening.

FIG. 1 shows a wall 10 of a container on which a fill level transmitter is disposed, which has a sensor adapter 12, which comprises a portion projecting into the interior space of the container, on which a carrier 14 for a lever arm 16 of a floating body (not shown in more detail) is disposed. The sensor adapter 12 comprises a cover portion 18, which closes a mounting opening 20 in of the wall 10. For this purpose, the wall 10 comprises an outwardly projecting base 22, which comprises a circumferential undercut portion at least in segments, on which the cover portion 18 is locked by means of a complementary locking portion 26 with the interposition of a seal body 24 (FIG. 2).

Furthermore, the sensor adapter 12 comprises an outwardly open, slot-like opening 28, into which a sensor carrier 30 can be inserted. On the end region of the sensor carrier projecting into the container, the sensor carrier 30 bears a Hall sensor 32, which, when the sensor carrier 30 is in a mounted state, is positioned through the surrounding material of the portion of the sensor adapter 12 projecting into the container that is in functional proximity to a magnet 34 disposed on a carrier 14 for the lever arm 16 of the floating body (FIG. 2) so that, as a consequence of a rotation of the carrier 14 with a change in the level of the fluid in the container via the floating body floating on the surface of the fluid, a rotation of the magnet configured as a disc magnet 34 causes a change in the magnetic field strength in the area of the Hall sensor 32, which is converted into an electrical signal as a measurement for the fill level in the container. To this end, an electronics module 36 that is known per se is disposed on the sensor carrier 30 and the signal of said electronics module can be tapped via electric contacts 38 in a plug socket 40 of the sensor carrier 30. The contacts 38 also include contacts for the power supply of the electronics module 36.

The cover portion 18 of the sensor adapter 12 comprises a radially projecting, fork-like anti-rotation means 42, which together with a structure 44 disposed on the wall 10, prevents a rotation of the sensor adapter 12 with respect to the wall 10 and thus a change in position of the floating body in the interior of the container.

The carrier 14 is rotatably mounted with respect to the sensor adapter 12 by means of an axle bolt 46, which is guided by comb-like meshing parts of the carrier 14 and of the sensor adapter 12.

FIG. 2 shows the first embodiment of the fill level transmitter in a sectional representation and FIG. 3 shows an exploded view of said fill level transmitter.

A second embodiment of the fill level transmitter is depicted in FIGS. 4 to 6. The fill level transmitter can be disposed on both a side portion (FIG. 4a) or upper portion (FIG. 4b) of the wall 10 of the container. Of course, this also applies to the first embodiment of the fill level transmitter according to FIGS. 1 to 3.

A special advantage of this second embodiment is that the wall 10 of the container does not have to be broken through to mount the fill level transmitter, i.e., the barrier against fluid or vapors escaping remains intact, which is especially important in the case of a fuel container.

The fill level transmitter has a carrier adapter 48 disposed in the interior of the container and a sensor adapter 50 disposed on the outer side of the container, as well as a carrier 52 for the lever arm 54 of a floating body (not depicted in greater detail). To mount the two adapters 48, 50 on the wall 10, said wall is provided with a structure, for example in a blow mold for producing the container, which structure makes a secure hold of the adapters 48, 50 on the wall 10 possible.

On its side facing the wall, the carrier adapter 48 comprises a flange rim 56, with which the carrier adapter 48 is brought into contact with the inner side of the wall 10, for example by a manipulator in a blow mold. The wall 10 is then formed from the outside around the flange rim 56 by means of suitable molding elements, for example by means of a slider arranged on a blow mold. It is also possible to form an inner side undercut portion in the wall 10 first, and then snap the flange rim 56 into the undercut portion. The flange rim 56 also comprises a plurality of projections or ribs 58 projecting on the face side, which, during the mounting of the carrier adapter 48 on a still flow-soft wall 10, are pressed in a blow mold into the material of the wall 10 and together form an anti-rotation means for the carrier adapter 48 with respect to the wall 10.

In a manner comparable to the mounting of the carrier 14 on the sensor adapter 12 in the first embodiment, the carrier 52 is rotatably mounted on the carrier adapter 48 by means of comb-like meshing portions of the carrier 52 and of the carrier adapter 48, which are passed through by an axle bolt 60. Towards the face side of the wall 10, the carrier 52 bears a magnet 62, the magnetic field of which changes with a rotation of the carrier 52 with respect to the carrier adapter 48 with regard to the Hall sensor.

The sensor adapter 50 comprises a holding portion 64 interacting with the forming of the wall 10, which holding portion engages in an undercut portion 66 of the wall 10, which is formed during the creation of an undercut portion 68 on the inner side of the container for the carrier adapter 48. The sensor adapter 50 comprises a plurality [of] elastic connecting parts 72 connecting a central portion for receiving a sensor carrier 70 to an edge-side holding portion 64. Said elastic connecting parts are pretensioned in a spring-like manner in the direction of the wall 10 and press the central portion of the sensor adapter against the wall 10, in order to minimize and keep the distance between the Hall sensor and the magnet 62 constant.

The sensor adapter 50 furthermore comprises a projection 74 extending radially outwardly, which acts on the wall 10 with a raised structure 76 as an anti-rotation means for the sensor adapter 50.

Apart from the modified forming, the sensor carrier 70 corresponds functionally to the sensor carrier 30 of the first embodiment. Disposed on the sensor carrier 70 is a Hall sensor 78 and an electronics module 80, and it comprises a plug socket 82 for connecting signal and power supply lines. The sensor carrier 70 and the central portion of the sensor adapter 50 comprise an interacting locking mechanism in order to fasten the sensor carrier 70 on the sensor adapter 50 in a captive, but replaceable, manner in the event of a defect.

To sum up, the following must be stated: The present disclosure relates to a container, in particular a plastic fuel container, with a fill level transmitter that has a floating body, which is disposed on a rotatably mounted carrier 14, 52 via a lever arm 16, 54, and a magnet 34, 62, which is disposed on the carrier 14, 52 and which rotates together with the carrier when the carrier 14, 52 rotates as a result of the floating body, and a Hall sensor 32, 78, which is disposed in a fixed position relative to the magnet 34, 62, for detecting a field strength, which changes when the magnet 34, 62 rotates, as a measurement for the fill level in the container. According to the present disclosure, the Hall sensor 32, 78 is disposed on a sensor carrier 30, 70 which can be mounted from the outer side of the container.

The invention claimed is:

1. A plastic fuel container, with a fill level transmitter that has a floating body, which is disposed on a rotatably mounted carrier via a lever arm, and a magnet, which is disposed on the carrier and which rotates together with the carrier when the carrier rotates as a result of the floating body, and a Hall sensor, which is disposed in a fixed position relative to the magnet, for detecting a field strength, which changes when the magnet rotates, as a measurement for the fill level in the container, wherein the Hall sensor is disposed on a sensor carrier which is configured to be mounted from an outer side of the container, and wherein a wall of the container is formed with a common fastening contour for a carrier adapter disposed on an inner side of the container for the carrier of the lever arm, and also for a sensor adapter disposed on the outer side of the container for the sensor carrier.

2. The container according to claim 1, wherein the carrier adapter for the carrier of the lever arm of the floating body is disposed with an edge portion in an undercut portion of the wall of the container, which is produced by means of slider arrangement of a blow mold.

3. The container according to claim 2, wherein a complementary portion, which is on the outer side of the container, to the undercut portion forms a locking contour for a mounting portion of the sensor adapter.

4. The container according to claim 3, wherein the sensor adapter comprises a central portion for receiving the sensor carrier, which is connected to the mounting portion via a plurality of elastic connecting parts.

5. The container according to claim 4, wherein the elastic connecting parts press the central portion of the sensor adapter against the wall of the container.

6. The container according to claim 3, wherein the holding portion of the sensor adapter is formed with a radially inwardly projecting flange for engaging with the undercut portion formed on the outer side of the container.

7. The container according to claim 2, wherein the edge portion of the carrier adapter is formed with a radially outwardly projecting flange for engaging with the undercut portion formed on the inner side of the container.

8. The container according to claim 1, wherein the sensor adapter is configured as an insert part for a blow mold and is blown over during container molding.

9. The container according to claim 1, wherein the sensor adapter comprises an anti-rotation means interacting with a structure disposed on the wall of the container.

10. The container according to claim 1, wherein the carrier adapter comprises at least one anti-rotation element interacting with the wall of the container.

11. The container according to claim 10, wherein the carrier adapter comprises a plurality of ribs disposed on the face side, which during the mounting of the carrier adapter on the wall of the container, are pressed into the still flow-soft material of the wall.

12. The container according to claim 1, wherein the fastening contour is formed as a S-shape in cross-section on an uninterrupted wall of the container.

13. A fill level transmitter for a container comprising:
a floating body, which is disposed on a rotatably mounted carrier via a lever arm;
a magnet which is disposed on the carrier and which rotates together with the carrier when the carrier rotates as a result of the floating body;
a Hall sensor, which is disposed in a fixed position relative to the magnet, for detecting a field strength, which changes when the magnet rotates, as a measurement for the fill level in the container;
a carrier adapter for the lever arm of the floating body, which is to be disposed on the inner side of the container on a fastening contour of an uninterrupted wall of the container; and
a sensor adapter for receiving the Hall sensor, which is disposed on an outer side of the container on the uninterrupted wall of the container,
wherein the fastening contour formed on the uninterrupted wall of the container includes an outer undercut portion for mounting the sensor adapter and an inner undercut portion for mounting the carrier adapter.

14. The fill level transmitter according to claim 13, wherein an edge portion of the carrier adapter has a radially outwardly projecting flange for engaging with the inner undercut portion of the uninterrupted wall of the container, which is produced by means of slider arrangement of a blow mold.

15. The fill level transmitter according to claim 13, wherein a holding portion of the sensor adapter has a radially inwardly projecting flange for engaging with the outer undercut portion formed as a locking contour.

* * * * *